May 23, 1961      W. WRIGHT      2,985,303
QUICK CHANGE, CARTRIDGE TYPE, SIZING SCREEN, FOR ASPHALT PLANT
Filed Sept. 18, 1958
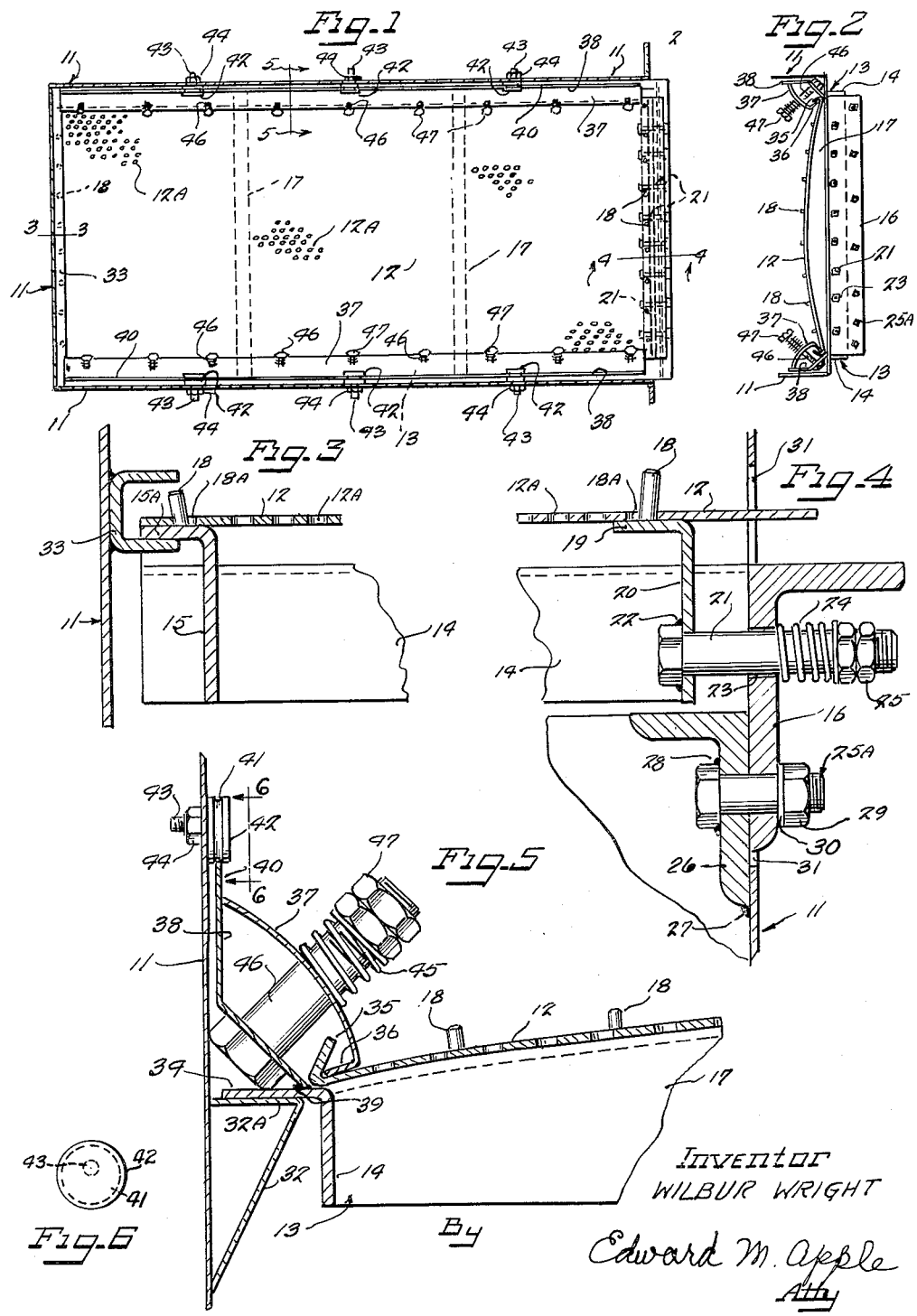
Inventor
WILBUR WRIGHT
By Edward M. Apple
Atty United States Patent Office 2,985,303
Patented May 23, 1961

2,985,303

QUICK CHANGE, CARTRIDGE TYPE, SIZING SCREEN, FOR ASPHALT PLANT

Wilbur Wright, 3800 Wood St., Lansing, Mich.

Filed Sept. 18, 1958, Ser. No. 761,892

6 Claims. (Cl. 209—405)

This invention relates to asphalt making equipment, and has particular reference to a quick change, cartridge type, sizing screen for use in an asphalt plant, such as disclosed in my co-pending application, Serial No. 761,871, filed September 18, 1958, although the device herein disclosed may also be used on any type of vibrating machine.

It is the present practice, when screens are to be removed, to shut down the plant, from four to six hours, to allow the screens to cool. One or more men must then crawl into the screen compartment, or close to it, in confined quarters, and remove some forty or more nuts and bolts per screen section. There are at least four screens in the compartment. The men must then struggle with the large flexible screens to remove them and struggle to replace them with others, and after the replacements are made, they have to replace all of the bolts and nuts previously removed. Such an operation, as just described, takes from six and a half to eight and a half hours.

Replacement of the screen holding frame as herein provided for, may be made while the screens are hot and by the simple expedient of loosening three nuts on each side and shifting six cams and loosening the front securing nuts, which takes not over a half hour.

It is, therefore, an object of the invention to obviate the foregoing difficulties, and to generally improve, sizing screens and their mountings, and to provide means, whereby sizing screens may rapidly be removed and replaced without the necessity of closing down the plant, to cool off the screens.

Another object of the invention is to provide a sizing screen, which is mounted in a special frame, which is readily slidable from its supports, whereby screens may be interchanged in a plant with a minimum of labor, by one man with a wrench, and without the use of special tools.

A further object of the invention is to provide a simplified screen mounting, which enables the plant operator to inventory a supply of such framed screens, for quick and easy replacement.

The foregoing and other objects and advantages of the invention will become more apparent as the description proceeds, reference being made from time to time to the accompanying drawing, forming part of the within disclosure, in which drawing:

Fig. 1 is a top plan view, with parts in section, of the sizing screen embodying my invention.

Fig. 2 is a right end elevational view of the device shown in Fig. 1.

Fig. 3 is an enlarged section, taken substantially on the line 3—3 of Fig. 1.

Fig. 4 is an enlarged section, taken substantially on the line 4—4 of Fig. 1.

Fig. 5 is an enlarged section, taken substantially on the line 5—5 of Fig. 1.

Referring now more particularly to the drawing, it will be understood that in the embodiment herein disclosed, the reference character 11 indicates the housing, comprising part of the tower section, of an asphalt plant, in which the screens are used. It will be understood that the interior of the housing 11, including the tower section of the asphalt plant is heated as in conventional practice. It also will be understood that in the average asphalt plant, four such screens are used. Such screens differ only in the size of the holes, through which the aggregates are passed. Therefore, a description of one screen will suffice for all.

Each screen consists of a plate 12, having perforations 12A, therein. The plate 12 is convexly curved from side to side, as shown in Fig. 2, and is mounted in a frame 13, consisting of a pair of side members 14, a rear end member 15, a front end member 16, and curved cross members 17, all of which are secured together by welding, or other suitable means. The plate 12 is held in position on the frame 13, by means of a plurality of pins 18, which engage the holes 18A formed in the plate 12. The pins 18 are carried on an extension 15A, comprising part of the end member 15, and on one leg 19, of an angular bar 20, which is secured in position by means of a plurality of bolts 21, which bolts are welded, as at 22, to the bar 20, and extend loosely through holes 23, formed in the member 16. The bolts 21 are spring loaded, as at 24, and are secured by the lock nuts 25, so that tension may be put on the bar 20, to lock the screen 12, on the pins 18. The end member 16, comprising part of the frame 13, is bolted, as at 25A, to an angular support 26, which is welded to the housing 11, as at 27. The bolts 25A are welded, as at 28, to the support member 26, and are provided with nuts 29, and lock washers 30, which when removed, permits the screen and frame assembly, to be slid through the opening 31, formed in the housing 11. This is an important feature of the invention.

The screen and frame assembly 12 and 13, is supported, at the sides, by means of angular brackets 32 (Fig. 5), and at the rear end, by the channel 33, all of which are welded to the inside of the housing 11. The horizontal legs 32A of the brackets 32, serve as tracks for the horizontal legs 34, of the frame members 14, so the frame 13 may be slid thereon.

In order to hold the screen and frame assembly 12 and 13, in position on the tracks 32A, I provide a mechanism which I will now describe.

Each side edge of the screen 12, is upturned as at 35, to engage the hook 36 formed along the edge of a spring bar 37, positioned along either side of the screen. The other edge of the spring bar 37 abuts against an angular member 38, which is welded, as at 39, to the side member 14. The free edge 40 of the angular member 38, is arranged to be contacted by the grooves 41, of the eccentric locking members 42, which are bolted, as at 43, to the housing 11, and are secured by the lock nuts 44. When the nuts 44 are loosened, the eccentrics 42 may be turned, to permit the screen and frame assembly 12, and 13, to slide along the tracks 32A for removal. Tension is maintained on the members 37 and 38, as at 45, by means of spring loaded bolts 46, and the lock nuts 47.

From the foregoing it will be seen that the screen and frame assembly may easily be removed from the housing 11, after the eccentrics 42 are loosened, and the nuts 29 are removed from the bolts 25A. The screen and frame assembly may be replaced by the reverse operation.

It is believed that the operation of the device is obvious from the foregoing description.

Having described my invention, what I claim and desire to secure by Letters Patent is:

1. A sifting screen assembly for an asphalt plant comprising in combination, a housing, comprising a heated enclosure, a frame secured to said housing, by means accessible from the exterior of said housing, and a perforated plate secured to said frame, there being means for securing said plate to said frame, said means including an angular member secured at one edge to said frame, the other edge being in contact with said first named means, and a second angular member having one edge in engagement with an upturned edge of said plate and its other edge in contact with said first angular member, and a spring-backed bolt having a nut thereon extending through both said angular members.

2. A sifting screen assembly for an asphalt plant comprising in combination, a housing, comprising a heated enclosure, a frame secured to said housing, by means accessible from the exterior of said housing, and a perforated plate secured to said frame, said plate being secured to said frame, in part, by pins positioned on an angular bar comprising part of said frame said angular bar being secured to an angular member carried by said housing, there being spring-backed elements extending through said angular bar and said last named angular member.

3. A sifting screen assembly for an asphalt plant comprising in combination, a housing, comprising a heated enclosure, a frame secured to said housing, by means accessible from the exterior of said housing, and a perforated plate secured to said frame, said plate being secured to angular bars comprising part of said frame, by pins positioned on said bars and extending through apertures in said plate, there being spring loaded means co-acting between said bars and members secured to said housing for maintaining said pins in engagement with the apertures in said plate.

4. In a device of the character described in combination, a housing comprising a heated enclosure having tracks secured to two inner walls thereof, a frame slidable on said tracks and removable through an opening in said housing, a screen secured to said frame by spring loaded means co-acting between said screen and members carried on said frame, the last named members being in contact with cam members carried on said housing.

5. In a device of the character described in combination, a housing comprising a heated enclosure and being part of an asphalt plant, tracks secured to the inner walls of said housing, a frame slidable on said tracks and removable through an opening in said housing, a screen carried by said frame and secured to said frame by spring loaded means co-acting between means carried on said screen and means carried on said frame, said frame being secured to said housing by said last named means and adjustable cam members carried by said housing.

6. In a device of the character described in combination, a housing having an opening in the front thereof, means on the inner wall of said housing for supporting a screen frame for slidable movement through said opening, a screen frame mounted on said first named means, a screen secured to said frame, said screen securing means including an angular member secured to said frame and having its free edge terminate along the inner wall of said housing, eccentric cam members on the wall of said housing in contactable relation with said angular member and having supporting means extending through said housing, a plate like member having one end in engagement with an edge of said screen, the other edge of said plate being in contact with said angular member, and a spring-backed bolt extending through said angular member and said plate like member.

References Cited in the file of this patent

UNITED STATES PATENTS

| | | |
|---|---|---|
| 250,783 | Case | Dec. 13, 1881 |
| 1,693,940 | Robins | Apr. 12, 1927 |
| 1,932,920 | Berghoefer | Oct. 31, 1933 |
| 2,193,954 | Warner | Mar. 19, 1940 |
| 2,345,947 | Parks | Apr. 4, 1944 |
| 2,609,930 | Soldan | Sept. 9, 1952 |
| 2,670,079 | Betts | Feb. 23, 1954 |
| 2,685,368 | Dion | Aug. 3, 1954 |
| 2,774,477 | Pollitz | Dec. 18, 1956 |